US010730253B2

(12) United States Patent
Yamamura et al.

(10) Patent No.: US 10,730,253 B2
(45) Date of Patent: Aug. 4, 2020

(54) PROCESS FOR PRODUCING SURFACE-MODIFIED MOLDED ARTICLE, AND PROCESS FOR PRODUCING COMPOSITE USING SURFACE-MODIFIED MOLDED ARTICLE

(71) Applicant: OSAKA UNIVERSITY, Osaka (JP)

(72) Inventors: Kazuya Yamamura, Osaka (JP); Yuji Ohkubo, Osaka (JP); Kento Ishihara, Osaka (JP); Masafumi Shibahara, Hyogo (JP); Asahiro Nagatani, Hyogo (JP); Koji Honda, Hyogo (JP)

(73) Assignee: OSAKA UNIVERSITY, Osaka (JP)

( * ) Notice: Subject to any disclaimer, the term of this patent is extended or adjusted under 35 U.S.C. 154(b) by 284 days.

(21) Appl. No.: 15/508,576

(22) PCT Filed: Sep. 4, 2015

(86) PCT No.: PCT/JP2015/075272
§ 371 (c)(1),
(2) Date: Mar. 3, 2017

(87) PCT Pub. No.: WO2016/035894
PCT Pub. Date: Mar. 10, 2016

(65) Prior Publication Data
US 2017/0282469 A1 Oct. 5, 2017

(30) Foreign Application Priority Data
Sep. 5, 2014 (JP) .................................. 2014-181663

(51) Int. Cl.
*B29C 71/04* (2006.01)
*B32B 27/30* (2006.01)
(Continued)

(52) U.S. Cl.
CPC .......... *B29C 71/04* (2013.01); *B29C 37/0025* (2013.01); *B29C 65/4835* (2013.01);
(Continued)

(58) Field of Classification Search
CPC ........ B29C 37/0025; B29C 71/04; C08J 5/12; H01L 21/32136
(Continued)

(56) References Cited

U.S. PATENT DOCUMENTS 5,425,832 A 6/1995 Kusano et al.
6,124,770 A * 9/2000 Sakamoto ................ C08J 9/103
333/242

(Continued)

FOREIGN PATENT DOCUMENTS

EP 0 479 592 4/1992
JP 1-138242 5/1989
(Continued)

OTHER PUBLICATIONS

Wikipedia, The Free Encyclopedia; "Polytetrafluoroethylene" via https://en.wikipedia.org/wiki/Polytetrafluoroethylene; pp. 1-13; 2019.*
(Continued)

*Primary Examiner* — Binh X Tran
(74) *Attorney, Agent, or Firm* — Wenderoth, Lind & Ponack, L.L.P.

(57) ABSTRACT

An object of the present invention is to provide a process for producing a surface-modified molded article, whereby surface layer strength of a molded article can be enhanced, and a molded article containing an organic polymer compound with low adhesive property, such as a fluororesin, can be bonded to an adherend without the use of an adhesive, and whereby a treatment step or an apparatus in an atmospheric-pressure plasma treatment are not complicated, and to provide a process for producing a composite of the surface-
(Continued)

modified molded article and an adherend. The present invention is a process for producing a surface-modified molded article wherein a surface of the molded article containing an organic polymer compound is subjected to an atmospheric pressure plasma treatment to introduce a peroxide radical with adjusting the surface temperature of the molded article to (melting point of the organic polymer compound −120° C. or higher.

6 Claims, 3 Drawing Sheets

(51) Int. Cl.
  *C08J 5/12* (2006.01)
  *C08J 7/00* (2006.01)
  *C08J 7/12* (2006.01)
  *B29C 37/00* (2006.01)
  *B29C 65/48* (2006.01)
  *B29K 27/18* (2006.01)

(52) U.S. Cl.
  CPC .......... *B32B 27/30* (2013.01); *C08J 5/12* (2013.01); *C08J 5/121* (2013.01); *C08J 7/00* (2013.01); *C08J 7/123* (2013.01); *B29K 2027/18* (2013.01); *C08J 2327/18* (2013.01)

(58) Field of Classification Search
  USPC .......................................................... 216/67
  See application file for complete search history.

(56) References Cited

U.S. PATENT DOCUMENTS

| | | | | |
|---|---|---|---|---|
| 6,573,311 | B1 * | 6/2003 | Martakos | A61F 2/06 |
| | | | | 264/423 |
| 6,709,718 | B2 * | 3/2004 | O'Brien | B29C 59/14 |
| | | | | 427/358 |
| 2001/0050749 | A1 | 12/2001 | Watanabe | |
| 2002/0176946 | A1 | 11/2002 | O'Brien | |
| 2004/0214427 | A1 * | 10/2004 | Kloster | H01L 21/3105 |
| | | | | 438/637 |
| 2008/0237181 | A1 * | 10/2008 | Wagner | C23C 16/0245 |
| | | | | 216/13 |
| 2010/0028561 | A1 | 2/2010 | Dubreuil et al. | |
| 2011/0104509 | A1 | 5/2011 | Poulsson et al. | |
| 2011/0116992 | A1 * | 5/2011 | North | B29C 59/14 |
| | | | | 422/503 |

FOREIGN PATENT DOCUMENTS

| | | |
|---|---|---|
| JP | 5-125202 | 5/1993 |
| JP | 6-41337 | 2/1994 |
| JP | 6-246542 | 9/1994 |
| JP | 10-315400 | 12/1998 |
| JP | 2000-17091 | 1/2000 |
| JP | 2002-361667 | 12/2002 |
| JP | 2006-272739 | 10/2006 |
| JP | 2009-263529 | 11/2009 |
| JP | 2010-156022 | 7/2010 |
| JP | 2010-523814 | 7/2010 |
| JP | 2011-81394 | 4/2011 |
| JP | 2011-521091 | 7/2011 |
| JP | 2012-33700 | 2/2012 |
| JP | 2012-62543 | 3/2012 |
| JP | 2012-153634 | 8/2012 |
| JP | 2012-153791 | 8/2012 |
| JP | 2012153791 A * | 8/2012 |
| JP | 2012-233038 | 11/2012 |
| JP | 2013-49819 | 3/2013 |
| JP | 2014-038876 | 2/2014 |
| JP | 2014-205731 | 10/2014 |
| WO | 02/083773 | 10/2002 |
| WO | 2013/008916 | 1/2013 |

OTHER PUBLICATIONS

Extended European Search Report dated Jan. 4, 2018 in European Application No. 15837867.9.
International Search Report dated Dec. 8, 2015 in International (PCT) Application No. PCT/JP2015/075272.
Zettsu et al., "A New Formation Route to form High-adhesion Polytetrafluoroethylene / Epoxy resin / SUS304 Interfaces through Plasma-assisted Morphological and Molecular Designs", vol. 65, № 5, 2014, pp. 227-233, with partial English translation.
Yamamoto et al., "Nanometer-level self-aggregation and three-dimensional growth of copper nanoparticles under dielectric barrier discharge at atmospheric pressure", Current Applied Physics, vol. 12, Apr. 20, 2012, pp. S63-S68.
Plastic Processing Databook (2nd edition), Japan, Nippon Kogyo Shimbun Co., Ltd., Jan. 28, 2002, 1st edition, 1st issue, pp. 2-3, with partial translation.
Notification of Reasons for Rejection dated May 7, 2019 in Japanese Patent Application No. 2015-175199, with English translation.
Notification of Reasons for Rejection dated Nov. 26, 2019 in corresponding Japanese Patent Application No. 2015-175199, with English Translation.
Office Action dated Jan. 23, 2019 in corresponding Chinese Application No. 201580047409.1, with English translation.

* cited by examiner

PROCESS FOR PRODUCING SURFACE-MODIFIED MOLDED ARTICLE, AND PROCESS FOR PRODUCING COMPOSITE USING SURFACE-MODIFIED MOLDED ARTICLE

TECHNICAL FIELD

The present invention relates to a process for producing a surface-modified molded article and a process for producing a composite using the surface-modified molded article.

BACKGROUND ART

Conventionally, in order to impart various kinds of functions to a surface of a molded article containing an organic polymer compound, an etching treatment, a UV ray treatment, a chemical vapor deposition treatment, a plasma treatment and the like have been carried out. For example, a molded article formed by using an organic polymer compound such as a fluororesin or a polyolefin resin has low wettability of the surface and is difficult to be bonded by using an adhesive. Therefore, an etching treatment or a plasma treatment has been performed as a treatment to improve the adhesive property of the surface of the molded article.

A fluororesin, for example, is excellent in chemical resistance, weather resistance, heat resistance, electrical insulation properties, and surface characteristics, and is currently used as an industrial material. However, there is a problem that a fluororesin has high chemical stability and is difficult to be bonded to different kinds of materials because it has extremely strong bonds between carbon atoms and fluorine atoms. Meanwhile, a polyolefin resin is highly versatile, but has a problem of difficulty of its adhesion to different kinds of materials since it has low surface polarity. Therefore, methods for modifying the surface of a molded article containing an organic polymer compound have been proposed.

As a method for modifying the surface of a molded article containing, for example, a fluororesin among organic polymer compounds, an etching treatment of applying a solvent or the like containing a sodium-naphthalene complex to the surface of a fluororesin material has widely been carried out so far. However, since an etching treatment method causes discoloration of a part to which the solvent adheres to dark brown color, it is undesirable in terms of the appearance of the product in the case where the discoloration is visible in the appearance. Further, metal sodium may possibly remain on the surface of the fluororesin material, and it is not preferable depending on applications. For example, application of the molded article to a member which is to be brought into contact with a pharmaceutical product in a container for enclosing a pharmaceutical product is undesirable.

To solve such problems of an etching treatment, methods for modifying the surface of a molded article containing a fluororesin by carrying out a plasma treatment on the surface are proposed (for example, refer to Patent Documents 1 and 2).

Patent Document 1 discloses a surface modification method including physical modification of implanting ions of plasma in the surface of a fluororesin-based molded article to roughen the surface of the molded article by applying negative voltage to the molded article, and chemical modification of replacing fluorine atoms in the surface of the molded article with atoms other than fluorine atoms. In this method, as for the case of carrying out atmospheric-pressure plasma irradiation, output power of a plasma irradiation source is set to be 10 to 1000 W and plasma irradiation time is set to be 5 seconds to 60 minutes. In the section of "Examples," it is described that the adhesion strength is 0.5 to 9.1 N/mm in the case where an epoxy-based adhesive is applied to the surface of a polytetrafluoroethylene (hereinafter, referred to as PTFE) sheet to which plasma irradiation is carried out at 300 W for 10 minutes under a reduced pressure of 0.5 or 1 Pa and then SUS304 is stuck thereto.

Patent Document 2 describes a surface-modified fluororesin film having a uniform thin film layer formed by graft-polymerizing a monomer containing a reactive unsaturated group such as acrylic acid on at least one surface of the fluororesin film layer, in a state where electric charges to be applied to the fluororesin film layer are eliminated while plasma irradiation is being carried out under predetermined conditions. Further, Patent Document 2 describes an article obtained by self-bonding an adherend which is directly bonded to this surface-modified fluororesin film by curing a thermosetting resin or rubber on the surface-modified fluororesin film.

Patent Document 3 discloses a fluororesin molded article having a content of fluorine atoms in the surface layer and a center line average roughness Ra that are adjusted by an ion implantation treatment, and having a predetermined number of pinholder-like fine projections per unit area.

Incidentally, it is known that PTFE among fluororesins turns to a gel at the melting point, and cannot generally be molded by injection molding or extrusion molding. Therefore, a sheet-like molded article of PTFE (PTFE sheet) can generally be obtained by compression molding a columnar molded material and cutting the surface of the material. It is known that when a peeling test is carried out on a composite which is obtained by subjecting the surface of the PTFE sheet obtained in such a manner to a plasma treatment and bonding the PTFE sheet to an adherend, the PTFE sheet is sometimes easily separated while the thin layer of the surface of the PTFE sheet remains bonded to the adherend. This is probably attributed to the following: the surface layer separation of the PTFE itself is caused due to the low strength of the surface part of the PTFE sheet resulting from the effect of the cutting treatment at the time of molding, although the bonding effect is obtained by the plasma treatment on the surface of the PTFE sheet.

PRIOR ART DOCUMENTS

Patent Documents

Patent Document 1: JP-A-2009-263529
Patent Document 2: JP-A-2012-233038
Patent Document 3: JP-A-2000-017091

SUMMARY OF THE INVENTION

Problems to be Solved by the Invention

As described above, in the invention disclosed in Patent Document 1, a PTFE sheet surface-roughened by a plasma treatment under reduced pressure and SUS304 are bonded to each other with an epoxy-based adhesive. As described above, in the invention disclosed in Patent Document 1, although the output power of the atmospheric-pressure plasma treatment and irradiation time are described, the thin layer of the surface of the PTFE sheet is strengthened by the adhesive and the surface layer separation is probably suppressed, and moreover, it is necessary to bond the sheet to an adherend by using an adhesive. According to the investigations by the inventors of the present invention, it is confirmed that the PTFE itself causes surface layer separation in the case where no adhesive is used, under the treatment conditions of an atmospheric-pressure plasma treatment of roughening the surface of the PTFE sheet as described in Patent Document 1.

In the invention described in Patent Document 2, a monomer containing a reactive unsaturated group is graft-polymerized to the surface of a fluororesin film subjected to an atmospheric-pressure plasma treatment under predetermined conditions, and rubber is cured on the surface of the film. As described above, in the invention described in Patent Document 2, although the conditions of the atmospheric-pressure plasma treatment are described, a predetermined monomer is graft-polymerized to the surface of a PTFE sheet. Accordingly, the surface layer separation is supposed to be suppressed to a certain extent, but it is sometimes insufficient for practical applications. Further, since monomer vapor is used at the time of the plasma treatment, the treatment is complicated and the apparatus for the treatment is also complicated.

Additionally, in Patent Document 3, the PTFE sheet has an uneven surface with a center line average roughness Ra in a predetermined range, and the uneven surface has pinholder-like fine projections in a predetermined range. The uneven surface works advantageously to a certain extent for bonding to rubber or the like, but in the case of applications of the sheet to a high frequency printed circuit board by bonding to a metal, the surface roughness adversely hinders electric current.

As described above, it is supposed that surface layer separation of PTFE itself occurs and peel strength is lowered because of decrease of strength of the surface part of the PTFE sheet obtained by cutting. However, taking the effect of plasma into consideration, regardless of the kind of an organic polymer compound and the configuration of a molded article, it is considered that the plasma treatment gives the adhesion effect to a certain extent. Consequently, it is supposed that sufficient peel strength between a molded article containing an organic polymer compound and an adherend cannot be obtained because of the effect of surface layer separation of the organic polymer compound itself.

Accordingly, an object of the present invention is to provide a process for producing a surface-modified molded article, whereby surface layer strength of a molded article can be enhanced, and a molded article containing an organic polymer compound with low adhesive property, such as a fluororesin, can be bonded to an adherend without the use of an adhesive, and whereby a treatment step or an apparatus in an atmospheric-pressure plasma treatment are not complicated, and to provide a process for producing a composite of the surface-modified molded article and an adherend.

Solutions to the Problems

In consideration of the above-mentioned problems, the inventors of the present invention earnestly made investigations. As a result, the inventors found that adjusting the temperature of the molded article surface at a high temperature around the melting point at the time of the atmospheric-pressure plasma treatment can improve the mobility of macromolecules of an organic polymer compound, can introduce peroxide radicals into the molded article surface, can generate carbon-carbon bonds among organic polymer molecules, and can accordingly improve the surface hardness. The inventors further found that the surface of the molded article treated in such a manner and an adherend can be bonded to each other by bringing them into contact with each other even without the use of an adhesive, and these findings have now led to completion of the present invention. The present invention can be summarized as follows.

The present invention of a process for producing a surface-modified molded article is characterized in that a surface of the molded article containing an organic polymer compound is subjected to an atmospheric pressure plasma treatment to introduce a peroxide radical with adjusting the surface temperature of the molded article to (melting point of the organic polymer compound −120° C. or higher. The surface temperature of the molded article is preferably (melting point of the organic polymer compound −100° C. or higher.

In the process, it is preferable that (i) a modified surface of the molded article has an indentation hardness by nano-indentation of 1.4 times or more than that of the surface of the molded article before the atmospheric-pressure plasma treatment is carried out, (ii) the organic polymer compound is polytetrafluoroethylene, (iii) a modified surface of the molded article has a root mean square surface roughness of 1.5 times or less than that of the surface of the molded article before the atmospheric-pressure plasma treatment is carried out, (iv) the atmospheric-pressure plasma treatment is carried out using only a non-polymerizable gas, or the like.

The present invention comprises a process for producing a composite comprising a step of bringing a surface of a surface-modified molded article obtained by the above-mentioned process into contact with an adherend to directly bond the adherend to the surface of the surface-modified molded article. In the process, the adherend is preferably cured by heating.

The adherend is preferably (a) rubber or a thermosetting resin, or (b) a silver-containing composition containing a silver compound (A) represented by the following formula (1) and an amine compound (B) represented by the following formula (2), wherein the composition contains 10 to 50 mass % of the silver compound (A) and 50 to 90 mass % of the amine compound (B) relative to 100 mass % in total of the silver compound (A) and the amine compound (B).

[Chem. 1]

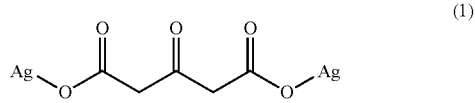

(1)

(2)

($R^1$ denotes hydrogen, —$(CY_2)_a$—$CH_3$, or —$((CH_2)_b$—O—$CHZ)_c$—$CH_3$, and $R^2$ denotes a phenyl group, —$(CY_2)_d$—$CH_3$, or —$((CH_2)_e$—O—$CHZ)_f$—$CH_3$: wherein Y denotes a hydrogen atom or —$(CH_2)_g$—$CH_3$, Z denotes a hydrogen atom or —$(CH_2)_h$—$CH_3$, a denotes an integer of 0 to 8, b denotes an integer of 1 to 4, c denotes an integer of 1 to 3, d denotes an integer of 1 to 8, e denotes an integer of 1 to 4, f denotes an integer of 1 to 3, g denotes an integer of 0 to 3, and h denotes an integer of 0 to 2), The present invention also comprises a process for producing a composite comprising:

a step of reacting a grafting agent on a surface of a surface-modified molded article obtained by the process according to any one of claims 1 to 6 to fix a functional group capable of forming a coordinate bond with a silver ion, and a step of forming a silver thin film layer by applying a silver-containing composition containing a silver compound (A) represented by the following formula (1) and an amine compound (B) represented by the following formula (2) to the surface of the surface-modified molded article to which the functional group capable of forming a coordinate bond with a silver ion is fixed, and heating and curing the silver-containing composition, wherein the composition contains 10 to 50 mass % of the silver compound (A) and 50 to 90 mass % of the amine compound (B) relative to 100 mass % in total of the silver compound (A) and the amine compound (B).

[Chem. 2]

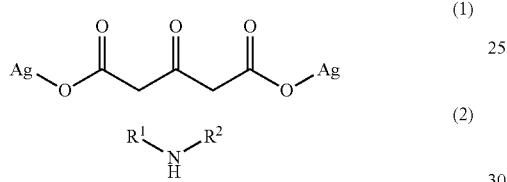

(R$^1$ denotes hydrogen, —(CY$_2$)$_a$—CH$_3$, or —((CH$_2$)$_b$—O—CHZ)$_c$—CH$_3$, and R$^2$ denotes a phenyl group, —(CY$_2$)$_d$—CH$_3$, or —((CH$_2$)$_e$—O—CHZ)$_f$—CH$_3$: wherein Y denotes a hydrogen atom or —(CH$_2$)$_g$—CH$_3$, Z denotes a hydrogen atom or —(CH$_2$)$_h$—CH$_3$, a denotes an integer of 0 to 8, b denotes an integer of 1 to 4, c denotes an integer of 1 to 3, d denotes an integer of 1 to 8, e denotes an integer of 1 to 4, f denotes an integer of 1 to 3, g denotes an integer of 0 to 3, and h denotes an integer of 0 to 2), The grafting agent is preferably a complex compound and/or a complex polymer containing a functional group including an atomic group which contains at least one element selected from the group consisting of N, P, and S and is capable of forming a coordinate bond with a silver ion. It is further preferable that the complex compound is at least one compound selected from the group consisting of vinylamine, acrylamide, acrylamine, acrylonitrile, vinylaniline, vinyl isocyanate, vinylpyrrole, vinylpyrrolidone, vinyltriazine, vinyl phosphonic acid, vinyl phosphoric acid, vinylthiol, vinylthiophene, and vinyl sulfonic acid, and the complex polymer is at least one polymer compound containing a polymer of the complex compound.

Effects of the Invention

According to the surface modification method of the present invention, an atmospheric-pressure plasma treatment with adjusting a molded article surface temperature to a high temperature close to the melding point can introduce peroxide radicals into the surface of a molded article containing an organic polymer compound with low adhesive property, such as a fluororesin, and can improve the strength of the surface layer of the molded article. Consequently, according to the process for producing a composite of the present invention using the surface-modified molded article of the present invention and an adherend, no monomer vapor needs to be used in an atmospheric-pressure plasma treatment, so that the treatment step or apparatus are not complicated, and a composite having a bonding strength (peel strength, adhesive strength) equal to or more than that achieved by a conventional method can be provided without the use of an adhesive.

BRIEF DESCRIPTION OF THE DRAWINGS

FIG. 1 is a conceptual view of an atmospheric-pressure plasma treatment apparatus.

MODE FOR CARRYING OUT THE INVENTION

Figure 1A:
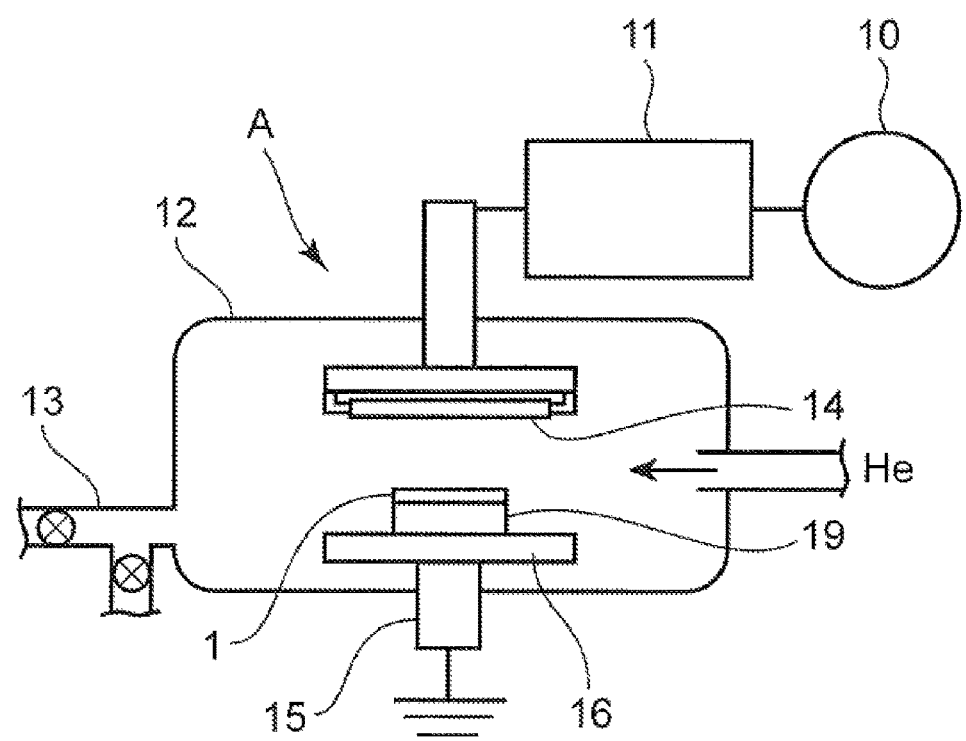
FIG. 1A is an entire side view and FIG. 1B is a plan view showing a relation between a rod electrode and a substrate.

The process for producing a surface-modified molded article of the present invention, in which the surface of a molded article containing an organic polymer compound is subjected to atmospheric-pressure plasma at a surface temperature of the molded article of (melting point of the organic polymer compound −120° C. or higher, can introduce peroxide radicals into the surface of the molded article, and the surface hardness can be improved.

As described above, at the time of the atmospheric-pressure plasma treatment, the surface temperature of a molded article is adjusted to a temperature of (melting point of the organic polymer compound contained in the molded article (hereinafter, sometimes simply referred to as melting point) −120° C. or higher. Adjustment of the surface temperature in such a range enhances mobility of macromolecules of the organic polymer compound in the surface of the molded article which is to be subjected to plasma irradiation. Plasma irradiation to an organic polymer compound in the high mobility state as described above can cause crosslinking reaction of carbon atoms whose bonds in the macromolecules are disconnected when bonds of a carbon atom to a carbon atom or an atom other than carbon to a carbon atom is disconnected in the organic polymer compound, can improve the surface layer strength, and can sufficiently form peroxide radicals. The surface temperature of the molded article is more preferably (melting point −100° C. or higher, and further preferably (melting point −80° C. or higher. Particularly, when the organic polymer compound comprising the molded article is PTFE, it is preferable to adjust the surface temperature of the molded article within the above-mentioned range. Further, the surface temperature of the molded article is preferably 20° C. or higher along with satisfying the requirement of (melting point −120° C. or higher. The upper limit of the surface temperature of the molded article is not particularly limited, but may be adjusted to, for example, (melting point +20° C. or lower.

In the present invention, this effect of improving the strength of the surface layer can be known using the indentation hardness of the surface of the molded article by nano-indentation (hereinafter, simply referred to as "indentation hardness") as an index. This indentation hardness (Hardness, unit: $N/mm^2$) can be expressed using the average value of measurements under conditions of an indentation load of 40 µN and the number of measurement times of 50.

The peroxide radical density in the surface of the molded article modified by the producing process of the present invention can be 1.4 times or more, and is preferably 1.5 times or more, further preferably 1.8 times or more than that of a molded article subjected to the atmospheric-pressure plasma treatment at a surface temperature lower than (melting point −120° C.

In the present invention, the indentation hardness of the surface of the surface-modified molded article is preferably 1.4 times or more than the hardness of the surface of the molded article before the plasma treatment. Carrying out an atmospheric-pressure plasma treatment with adjusting the surface temperature of a molded article as described above can improve the indentation hardness, can improve the strength of the surface layer part of the surface-modified molded article, and can improve the bonding strength at the time of producing a composite of the molded article with an adherend. From a viewpoint of further improvement of the bonding strength of a composite, the indentation hardness of the surface of the surface-modified molded article is more preferably 1.5 times or more, further preferably 1.6 times or more, and particularly preferably 1.7 times or more than that before the plasma treatment. Although the upper limit of the indentation hardness is not particularly limited, the upper limit may be, for example, 2.5 times or less.

Although the indentation hardness of the surface of the surface-modified molded article differs depending on the kind of the organic polymer compound comprising the molded article, the indentation hardness may be, for example, 170 $N/mm^2$ or more, preferably 185 $N/mm^2$ or more, and more preferably 200 $N/mm^2$ or more in the case where the organic polymer compound is, for example, PTFE. The upper limit of the indentation hardness may be, for example, 250 $N/mm^2$ or less, although not particularly limited.

In the present invention, since the surface on the reverse side to the plasma-irradiated surface of the molded article is scarcely affected by the plasma treatment (for example, the effect of improving hardness is slighter than that on the plasma-irradiated surface), various characteristics (for example, chemical resistance, weather resistance, heat resistance, and electrical insulation properties) inherently possessed by an organic polymer compound are not impaired and sufficiently exhibited.

Further, the process for producing a surface-modified molded article of the present invention can lessen the root mean square surface roughness (nm, rms) of the surface of the molded article to a level lower than that before a plasma treatment. Generally, a plasma treatment roughens the surface to improve the adhesive property (for example, refer to Patent Document 1), whereas the plasma treatment in the present invention can modify the surface so as to smoothen the surface. That is, as described above, it is presumed that increase of mobility of macromolecules of an organic compound in the surface causes crosslinking reaction of carbon atoms in the macromolecules and suppresses formation of unevenness.

The root mean square surface roughness (rms) of the surface of the modified molded article is preferably 1.5 times or less, more preferably 1.3 times or less, further preferably 1.1 times or less, and particularly preferably 1 time or less than that of the surface before a plasma treatment is carried out. The lower limit of the ratio of the root mean square surface roughness of the surface of the modified molded article to that of the surface before a plasma treatment is carried out is, for example, 0.3 times or more, although not particularly limited. The value of the root mean square surface roughness of the surface of a modified molded article may be, for example, 40 to 250 (nm rms) although it depends on the kind of an organic polymer compound comprising the molded article and the surface condition before a plasma treatment is carried out.

Examples of a usable organic polymer compound comprising a molded article in the present invention may include fluororesins, olefin-based resins such as polyethylene resins, polypropylene resins, and cycloolefin resins, polyester-based resins such as poly(ethylene terephthalate) resins, polyimide-based resins, styrene-based resins such as styrene resins and syndiotactic polystyrene resins, aromatic polyether ketone-based resins such as aromatic polyether ketone resins, polyether-ether ketone resins, and polyphenylene ether resins, polyacetal-based resins, polyphenylene sulfide-based resins, and bismaleimide triazine-based resins. One or more kinds of these may be contained. Examples of the organic polymer compound containing two or more kinds of them may include liquid crystal polymers represented by fluororesins and polyester-based resins as well as polymer alloys and copolymers with polyimide resins. Among them, a fluororesin and an olefin-based resin are preferably used, since improvements of the adhesive properties of them are more effective, and a fluororesin is particularly preferable.

Examples of a fluororesin may include polytetrafluoroethylene (PTFE, melting point: 327° C.), polychlorotrifluoroethylene (PCTFE, melting point: 220° C.), polyvinylidene fluoride (PVDF, melting point: 151 to 178° C.), polyvinyl fluoride (PVF, melting point: 203° C.), a tetrafluoroethylene-hexafluoropropylene copolymer (FEP, melting point: 250 to 275° C.), a tetrafluoroethylene-perfluoroalkyl vinyl ether copolymer (PFA, melting point: 302 to 310° C.), a tetrafluoroethylene-ethylene copolymer (ETFE, melting point: 218 to 270° C.), a tetrafluoroethylene-perfluorodioxol copolymer (TFE/PDD), and a chlorotrifluoroethylene-ethylene copolymer (ECTFE, melting point: 245° C.). Among them, PTFE, FEP, and PFA are preferably used, and PTFE is particularly preferable from a viewpoint of the number of carbon-fluorine bonds per monomer unit (replacement ratio of fluorine atoms).

The configuration of a molded article to be used in the present invention is not particularly limited as long as the molded article is in a form to which plasma can irradiate, and those having various kinds of forms and structures may be employed. Examples of the form may include square form, spherical form, thin film form and the like having a surface shape such as a flat surface, a curved surface, or a bent surface, but not limited to these forms. Further, the molded article may be one formed by any of various kinds of molding methods such as injection molding, melt extrusion molding, paste extrusion molding, compression molding, cutting molding, cast molding, and impregnation molding, depending on the characteristics of an organic polymer compound. Still further, the molded article may have a dense and continuous structure of the resin as in, for example, a common injection molded article, may have a porous structure, may be in the form of a nonwoven fabric, or may have another structure.

In the present invention, the surface of a molded article containing an organic polymer compound is modified by atmospheric-pressure plasma. The conditions of the treatment by atmospheric-pressure plasma are not particularly limited as long as peroxide radicals can be introduced into the surface of the molded article. The conditions which can be employed in technical fields for modifying the surface of a molded article by plasma and which are capable of generating atmospheric-pressure plasma may be employed properly.

Naturally, in the present invention, in order to carry out the treatment by atmospheric-pressure plasma with the surface temperature of the molded article being adjusted to be in a predetermined temperature range capable of heightening the mobility of macromolecules of the organic polymer compound in the surface of the molded article, the atmospheric-pressure plasma treatment is preferably performed under conditions by which a heating effect is obtained in the case where the surface temperature is raised only by the heating effect of the atmospheric-pressure plasma treatment.

Atmospheric-pressure plasma may be generated using, for example, a high frequency electric power source with a frequency of applied voltage in a range of 50 Hz to 2.45 GHz. Further, the output power per unit area may be 15 W/cm$^2$ or higher, preferably 20 W/cm$^2$ or higher, and more preferably 25 W/cm$^2$ or higher although it cannot be generalized since it depends on a plasma generation apparatus, a constituent material or the like of a molded article. The upper limit of the output power per unit area may be, for example, 40 W/cm$^2$ or lower, but is not particularly limited. Further, in the case where pulsed output is used, pulse modulated frequency may be adjusted to 1 to 50 kHz (preferably 5 to 30 kHz) and pulse duty may be adjusted to 5 to 99% (preferably 15 to 80%, more preferably 25 to 70%). A cylindrical or plate-shaped metal piece with at least one side coated with a dielectric substance may be used as a counter electrode. The distance between mutually facing electrodes is preferably 5 mm or shorter, more preferably 3 mm or shorter, further preferably 1.2 mm or shorter, and particularly preferably 1 mm or shorter from a viewpoint of plasma generation and heating, although it depends on other conditions. The lower limit of the distance between mutually facing electrodes is not particularly limited, but may be, for example, 0.5 mm or longer.

A gas to be used for generating plasma may be, for example, rare gases such as helium, argon, and neon, and reactive gases such as oxygen, nitrogen, and hydrogen. That is, as a gas to be used in the present invention, it is preferable to use only a non-polymerizable gas. This is because a polymerization-reactive gas such as the vapor of a monomer as described in Patent Document 2 makes the plasma treatment step and an apparatus to be employed complicated as described above.

Particularly, the oxygen concentration during the plasma treatment is preferably lower since the adhesive strength to an adherend can be improved when the concentration is low. The oxygen concentration is preferably 0.3% or lower, more preferably 0.1% or lower, further preferably 0.01% or lower, and most preferably 0.005% or lower. The lower limit of the oxygen concentration is not particularly limited, but it is generally around 0.0005%.

Further, among these gases, one or more kinds of rare gases alone may be used, and alternatively, a gas mixture containing one or more kinds of rare gases and a proper amount of one or more kinds of reactive gases may be used. Plasma generation may be carried out under conditions in which the above-mentioned gas atmosphere is controlled by using a chamber or under conditions completely open to the atmosphere in which the rare gases are made to flow to electrode parts.

Hereinafter, one example of the embodiment of an atmospheric-pressure plasma treatment applicable to the surface modification method of the present invention will be explained by mainly showing the case of using molded article in a sheet form (thickness: 0.2 mm) made of PTFE with referring to drawings, but the present invention should not be limited to these examples, and may be naturally carried out in various configurations without departing from the gist of the present invention.

Figure 1B:
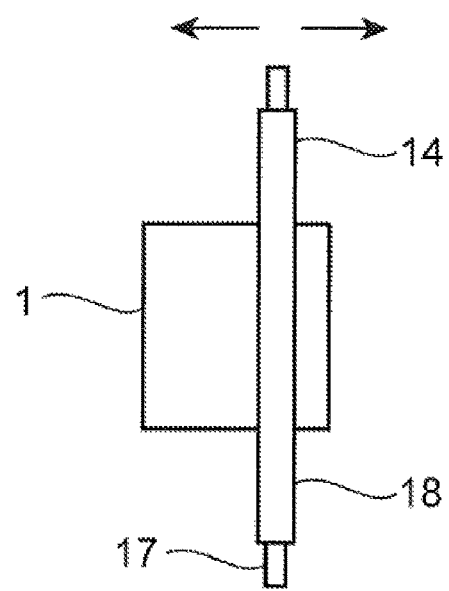

FIG. 1 shows a conceptual drawing of a capacitively coupled atmospheric-pressure plasma treatment apparatus which is one example of the atmospheric-pressure plasma treatment apparatus usable in the present invention. The atmospheric-pressure plasma treatment apparatus A shown in FIG. 1A includes a high frequency electric power source 10, a matching unit 11, a chamber 12, a vacuum exhaust system 13, an electrode 14, an earthed electrode elevating mechanism 15, a scanning stage 16, and a scanning stage control part (not illustrated). A sample holder 19 for holding a molded article 1 so that the molded article 1 opposes the electrode 14 is placed on the top surface of the scanning stage 16. As the sample holder 19, one made of, for example, an aluminum alloy can be employed. As the electrode 14, usable is one having a rod shape as illustrated in FIG. 1B and having a structure formed by sheathing the surface of an inner tube 17 made of, for example, copper with an outer tube 18 made of, for example, aluminum oxide ($Al_2O_3$).

The method for modifying the surface of a molded article using the atmospheric-pressure plasma treatment apparatus A shown in FIG. 1 is as follows.

First, a molded article is washed with an organic solvent such as acetone or with water such as ultrapure water if necessary, and then the molded article 1 in a sheet form is placed on the top surface of the sample holder 19 in the chamber 12 as shown in FIG. 1. Thereafter, air in the chamber 12 is sucked through the vacuum exhaust system 13 by a suction apparatus not illustrated to reduce the pressure and a gas for generating plasma is supplied to the chamber (see the arrow in FIG. 1A) to adjust the inside of the chamber 12 to be atmospheric pressure. The atmospheric pressure does not have to be strictly 1013 hPa, and may be in a range of 700 to 1300 hPa.

Next, the height of the electrode elevating mechanism 15 (the vertical direction in FIG. 1) is adjusted by the scanning stage control part to move the scanning stage 16 to a desired position. Adjustment of the height of the electrode elevating unit 15 enables adjustment of the distance between the electrode 14 and the surface (top surface) of the molded article 1. The distance between the electrode 14 and the surface of the molded article 1 is preferably 5 mm or shorter and more preferably 1.2 mm or shorter. Particularly, in the case where the temperature of the surface of a molded article is controlled to be in a specific range by spontaneous temperature increase owing to a plasma treatment, the distance is particularly preferably 1.0 mm or shorter. To move the molded article 1 by the scanning stage 16, the distance between the electrode 14 and the surface of the molded article 1 should of course be longer than zero.

Further, plasma irradiation to a desired part of the surface of a molded article is made possible by moving the scanning stage 16 in the direction at right angle to the axial direction of the electrode 14 (the direction of arrows in FIG. 1B (horizontal direction in FIG. 1)). For example, the moving rate of the scanning stage is preferably 1 to 3 mm/s, but the present invention should not be limited to the example. In addition, the plasma irradiation time to the molded article 1 can be adjusted by, for example, adjusting the moving rate or reciprocating the scanning stage 16 a desired number of times.

The high frequency electric power source 10 is operated while the scanning stage 16 is moved to move the molded article 1, whereby plasma is generated between the electrode 14 and the sample holder 19, and thus a desired area of the surface of the molded article 1 is irradiated with plasma. In this case, for example, one having the frequency of applied voltage and output power density as described above may be used as the high frequency electric power source, and an electrode made of alumina-coated copper and a sample holder made of an aluminum alloy, for example, may be used to makes it possible to generate glow discharge under dielectric barrier discharge conditions. Accordingly, peroxide radicals can be produced stably in the surface of a molded article. Formation of dangling bonds is induced owing to defluorination in the PTFE sheet surface with radicals, electrons, ions and the like contained in the plasma, and the dangling bonds are reacted with water and the like in the air by exposure to air remaining in the chamber or with clean air after the plasma treatment, thereby the peroxide radicals are introduced. Further, in the dangling bonds, hydrophilic functional groups such as hydroxy groups and carbonyl group are spontaneously formed besides peroxide radicals.

The intensity of plasma with which the surface of a molded article is irradiated may be properly adjusted by the above-mentioned various kinds of parameters of the high frequency electric power source, the distance between the electrode 14 and the surface of the molded article, and irradiation time. Consequently, in the case where the surface of a molded article is controlled to be in a specific range by spontaneous temperature increase by the plasma treatment, these conditions may be adjusted according to the characteristics of an organic polymer compound comprising the molded article. The above-mentioned preferable conditions (frequency of applied voltage, output power per unit area, pulse modulated frequency, pulse duty, and the like) for the atmospheric-pressure plasma generation are effective particularly in the case where the molded article is in form of a sheet made of PTFE. Further, it is possible to control the surface of a molded article within a specific temperature range by adjusting the integrated irradiation time to the surface of the molded article in accordance with the output power density. For example, the integrated irradiation time to the molded article surface is preferably 50 seconds to 3300 seconds, more preferably 250 seconds to 3300 seconds, and particularly preferably 550 seconds and 2400 seconds in the case where the frequency of the applied voltage is 5 to 30 MHz, the distance between the electrode 14 and the molded article surface is 0.5 to 2.0 mm, and the output power density is 15 to 30 W/cm$^2$. Particularly, it is preferable to adjust the surface temperature of a sheet-like molded article made of PTFE to 210 to 327° C. and to adjust irradiation time thereof to 600 to 1200 seconds. In the case where the irradiation time is long, the effect by heating tends to be produced. The plasma irradiation time means the integrated time of irradiation of the molded article surface with plasma, and it is sufficient that the molded article surface temperature is (melting point −120° C. or higher at least partially during the plasma irradiation time. For example, it is sufficient that the molded article surface temperature is (melting point −120° C. or higher over ½ or longer (preferably ⅔ or longer) of the plasma irradiation time. In any embodiment, adjustment of the surface temperature of a molded article to be within the above-mentioned range improves the mobility of PTFE molecules in the molded article surface, remarkably improves the probability of forming carbon-carbon bonds by bonding of carbon atoms of carbon-fluorine bonds in some PTFE molecules disconnected by plasma to carbon atoms of other PTFE molecules generated in the same manner, and improves the surface hardness.

Further, although not illustrated, a heating means for heating the molded article 1 may be provided separately. For example, to raise the environmental temperature in the chamber 12, a heating apparatus for heating the above-mentioned gas in the chamber and a circulation apparatus equipped with stirring blades or the like for circulating the heated gas in the chamber 12 may be provided in the chamber 12. Alternatively, a heat ray irradiation apparatus for radiating heat rays such as infrared rays to directly heat the surface of a molded article may be provided in the periphery of the electrode 14, a heating means may be provided in the sample holder 19 to heat the molded article 1 from the lower surface side, or these apparatuses may be combined. In the case where such a heating means is provided, the intensity of plasma can be lowered as compared with the case where only a heating effect of a plasma treatment is employed, and the output power per unit area may be lower than 15 W/cm$^2$ (however, preferably 5 W/cm$^2$ or higher). The heating temperature by a heating means may be properly set and controlled in consideration of the characteristics of an organic compound comprising a molded article, the form of a molded article, a heating effect by a plasma treatment, or the like. Further, in order to raise the temperature as desired at the time of plasma irradiation, it is preferable to previously heat a molded article before the high frequency electric power source 10 is operated.

Further, the surface temperature of a molded article at the time of a plasma treatment may be measured by using, for example, a temperature measurement seal or a radiation thermometer.

The molded article 1 subjected to the atmospheric-pressure plasma treatment at a predetermined temperature in the above-mentioned manner is cooled to give a surface-modified molded article. Even if the surface-modified molded article is preserved in the atmospheric air at room temperature for around 1 month, and if the surface-modified molded article is employed to produce a composite as described below, the surface-modified molded article has a sufficient adhesive property so that it can cause cohesive failure of butyl rubber, although the adhesive strength is lowered than that in the case where the molded article is employed for the production of a composite immediately after the surface treatment. This is probably attributed to the phenomenon that the hardness of the surface of a molded article is improved, and thus the peroxide radicals are kept in the surface without being taken into the inside of the molded article.

Additionally, use of the above-mentioned surface-modified molded article makes an adherend directly be bonded to the surface of the surface-modified molded article by bringing the adherend into contact with the modified surface of the molded article (modified surface). Particularly, in the case where an adherend has a reactive functional group, owing to the action of peroxide radicals introduced into the surface of the surface-modified molded article and the reactive functional group of the adherend, bonds between the reactive functional group and the radicals are formed to make direct bonding between the surface-modified molded article and the adherend possible.

When a final composite is made, an adherend having a reactive functional group which is usable in the present invention is preferably in a state where the reactivity of the reactive functional group is substantially lost by the reaction with the peroxide radicals introduce into the surface-modified molded article, the reaction of the constituent material itself of the adherend, and the like. That is, it is preferable to use the reactive functional group inevitably contained in the constituent material of an adherend for bonding to the surface-modified molded article. Further, taking the function of an adherend into consideration, such a functional group may be previously introduced into the constituent material of the adherend.

Examples of the constituent material of an adherend may include rubber, thermosetting resins, and a predetermined silver-containing composition.

Rubber usable in the present invention may be vulcanized rubber, thermosetting resin-based elastomers, and thermoplastic elastomers. Examples of the rubber may include butyl-based rubber, isoprene rubber, butadiene rubber, styrene-butadiene rubber, natural rubber, chloroprene rubber, nitrile-based rubber such as acrylonitrile-butadiene rubber, hydrogenated nitrile-based rubber, norbornene rubber, ethylene-propylene rubber, ethylene-propylene-diene rubber (hereinafter, referred to as "EPDM rubber"), acrylic rubber, ethylene-acrylate rubber, fluororubber, chlorosulfonated polyethylene rubber, epichlorohydrin rubber, silicone rubber, urethane rubber, polysulfide rubber, phosphazene rubber, and 1,2-polybutadiene. One kind of them may be used alone or two or more kinds of them may be used in combination. Among them, butyl-based rubber and EPDM rubber are preferable. From a viewpoint of the above-mentioned bonding to the surface-modified molded article, the rubber preferably has a reactive functional group such as halogen or a thiol group.

The butyl-based rubber is known to be excellent in resistance to gas permeability and resistance to water vapor permeability, and is suitable for uses as a faucet or the like required to have these characteristics. Examples of butyl-based rubber may include isobutylene-isoprene copolymer rubber, halogenated isobutylene-isoprene copolymer rubber (hereinafter, referred to as "halogenated butyl rubber"), and their modified substances. The modified substances may be bromides or the like of copolymers of isobutylene and p-methylstyrene. Among them, halogenated butyl rubber is preferable, and chlorinated butyl rubber and brominated butyl rubber are more preferable because of ease of crosslinking.

EPDM rubber is known to be excellent in processability, and is suitable for various kinds of molded products for which the characteristic is required. Examples of diene monomers of EPDM rubber may include dicyclopentathene, methylene norbornene, ethylidene norbornene, 1,4-hexadiene, and cyclooctadiene.

In the case where butyl-based rubber and EPDM rubber are used in combination, a combination of halogenated butyl rubber and EPDM rubber is preferable. Both are excellent in compatibility and rubber excellent in resistance to gas permeability, resistance to water vapor permeability, and processability can be obtained.

It is common to add a crosslinking agent to the above-mentioned rubber depending on the kind of macromolecules of the base resin and to crosslink the macromolecules by heating or the like. Consequently, in the present invention, when a composite is produced by using the rubber as an adherend, it is preferable for a crosslinking agent which is commonly selected depending on the kind of rubber as a base resin to act on peroxide radicals in the surface of the surface-modified molded article. Nevertheless, even a crosslinking agent which is not commonly used for macromolecules of the base resin but is capable of crosslinking in the same manner may be additionally added to an extent that the function of rubber is not hindered to improve the bond property to the surface-modified molded article. In the case where a crosslinking agent has a bonding effect, the macromolecules of the base resin do not have to necessarily contain a reactive functional group.

Examples of the crosslinking agents may include sulfur, peroxide-based crosslinking agents such as dicumyl peroxide, quinoid-based crosslinking agents such as p-quinone dioxime and p,p'-dibenzoylquinone dioxime, resin-based crosslinking agents such as low molecular weight alkylphenol resins, amine-based crosslinking agents such as diamine compounds (e.g. hexamethylenediamine carbamate), triazine thiol-based crosslinking agents such as 2-di-n-butylamino-4,6-dimercapto-s-triazine, polyol-based crosslinking agents, and metal oxide-based crosslinking agents.

Among them, in the case of butyl-based rubber, it is preferable to use a triazine thiol-based crosslinking agent from a viewpoint of improvement of bonding strength to the surface-modified molded article.

Examples of the thermosetting resins may include epoxy resins, phenol resins, polyurethanes, and polyimides, but the thermosetting resins are not limited thereto. A thermosetting resin is generally cured by crosslinking a monomer or an oligomer by heating, contains a compound having a reactive functional group before the curing, and turns into a cured substance by substantial elimination of the reactive functional group by crosslinking. Therefore, at the time of curing of the thermosetting resin, the surface-modified molded article and the cured substance of the thermosetting resin are bonded by the action of the reactive functional group and the peroxide radicals in the surface of the surface-modified molded article to give a composite.

Examples of the silver-containing composition may include compositions containing a silver compound (A) represented by the formula (1) and an amine compound (B) represented by the formula (2) at a specific ratio. The silver-containing compositions are, for example, those which are suitably used as a raw material of a metal film of a metal film-bearing dielectric substrate to be used as a high frequency device which is used for mobile phones and communication circuits.

The silver compound (A) is silver acetonedicarboxylate and is usually in a powder form. A viscosity of the silver compound (A) is increased when diluted with a solvent, so the silver compound (A) is a substance which is difficult to be subjected to patterning by printing or the like. However, the viscosity can be set at a low level by combination with the amine compound (B) even in a composition with a high content of silver. Further, the silver compound (A) has a high decomposition temperature in form of a simple substance, and takes a long time to produce metal silver by firing at 150° C. or lower (particularly at a temperature lower than 150° C.). However, combination of the silver compound (A) with the amine compound (B) makes it possible to produce metal silver by firing at a low temperature of 150° C. or lower (particularly at a temperature lower than 150° C.) over a short time. Further, owing to the synergistic effect of the silver compound (A) and the amine compound (B), the preservation stability (determined on the basis of production of precipitates of silver particles) is remarkably improved as compared with that in the case where another silver carboxylate is used.

In the silver-containing composition, the content rate of the silver compound (A) to 100 mass % in total of the silver compound (A) and the amine compound (B) is 10 to 50 mass %, and the content rate of the amine compound (B) thereto is 50 to 90 mass %. The content rate of the silver compound (A) is preferably 20 to 40 mass % and the content rate of the amine compound (B) is preferably 60 to 80 mass %. Further, in the case where the silver concentration is desired to be increased, the content rate of the silver compound (A) may be 50 to 70 mass %, but if the content rate of the amine compound (B) is lower than 50 mass %, the solubility of the silver compound (A) may be considerably lowered in some cases.

A process for producing the silver compound (A), which is silver acetonedicarboxylate to be used in the present invention, is not particularly limited, and may be the process described in a known document such as "Jornal fur praktische Chemie. Band 312 (1970) pp. 240-244." Particularly, in the case of producing silver acetonedicarboxylate by using a basic substance, it is desired to use an organic base to avoid contamination with metal ions.

The amine compound (B) to be used in the present invention is a compound represented by the formula (2) wherein $R^1$ denotes a hydrogen atom, $-(CY_2)_a-CH_3$, or $-((CH_2)_b-O-CHZ)_c-CH_3$, and $R^2$ denotes a phenyl group, $-(CY_2)_d-CH_3$, or $-((CH_2)_e-O-CHZ)_c-CH_3$. Herein, Y denotes a hydrogen atom or $-(CH_2)_g-CH_3$ and Z denotes a hydrogen atom or $-(CH_2)_h-CH_3$. The reference character a denotes an integer of 0 to 8; b denotes an integer of 1 to 4; c denotes an integer of 1 to 3; d denotes an integer of 1 to 8; e denotes an integer of 1 to 4; f denotes an integer of 1 to 3; g denotes an integer of 0 to 3 (particularly, an integer of 1 to 3); and h denotes an integer of 0 to 2 (particularly, an integer of 1 to 2).

Examples of the amine compound (B) may include one or more kinds of ethylamine, 1-propylamine, 1-butylamine, 1-pentylamine, 1-hexylamine, 1-heptylamine, 1-octylamine, 2-ethylhexylamine, isopropylamine, isobutylamine, isopentylamine, sec-butylamine, tert-butylamine, tert-amylamine, benzylamine, 3-methoxypropylamine, 2-ethoxylpropylamine, 3-isopropoxypropylamine, diisopropylamine, and dibutylamine.

In the case where a silver-containing composition used in the present invention is applied to a reflecting electrode or the like required to have a light reflecting function, the metal silver film to be obtained is required to have high flatness (smoothness). In the case of application to a reflecting electrode or the like, $R^1$ in the amine compound (B) is preferably a hydrogen atom, $-(CY_2)_a-CH_3$, or $-((CH_2)_b-O-CHZ)_c-CH_3$, and it is particularly preferable that Y and Z are each a hydrogen atom or a methyl group, a denotes an integer of 2 to 6, b denotes an integer of 1 to 3, and c denotes 1 or 2. Similarly, it is desired that $R^2$ is $-(CY_2)_d-CH_3$ or $-((CH_2)_e-O-CHZ)_f-CH_3$, Y and Z are each a hydrogen atom, d denotes an integer of 1 to 6, e denotes an integer of 1 to 3, and f denotes an integer of 1 to 2. In the case where the low temperature sintering property at a temperature lower than 150° C. is to be exhibited, the amine compound (B) having a boiling point of lower than 130° C. is more preferably used. As the amine compound (B) satisfying these matters, preferred are, for example, one or more kinds of 1-propylamine, 1-butylamine, 1-pentylamine, 1-hexylamine, 1-heptylamine, 1-octylamine, isopropylamine, isobutylamine, isopentylamine, 3-methoxypropylamine, 2-ethoxypropylamine, 3-isopropoxypropylamine, diisopropylamine, and dibutylamine.

For the purpose of improving the coatability to a surface-modified molded article and adjusting the viscosity, a solvent may be properly added to the silver-containing composition used in the present invention in addition to the silver compound (A) and the amine compound (B). The amount of the solvent to be used is preferably 20 to 80 mass % to 100 mass % in total of the silver compound (A), the amine compound (B), and the solvent. The amount is more preferably 40 to 60 mass % to 100 mass % in total of the silver compound (A), the amine compound (B), and the solvent. If the amount of the solvent exceeds 80 mass %, a uniform silver film cannot be obtained in some cases due to the decrease of the silver content.

The kind of the solvent is not particularly limited, and those which can be removed easily at the time of silver film production are preferable. Examples of the kind of the solvent may include alcohols such as methanol, ethanol, 1-propanol, 2-propanol, 1-butanol, 2-butanol, tert-butanol, 1-pentanol, 2-pentanol, 3-pentanol, tert-amyl alcohol, ethylene glycol, butoxyethanol, methoxyethanol, ethoxyethanol, propylene glycol, propylene glycol monomethyl ether, propylene glycol monopropyl ether, propylene glycol monobutyl ether and dipropylene glycol monomethyl ether, ethers such as acetoxymethoxypropane, phenyl glycidyl ether, and ethylene glycol glycidyl, ketones such as acetone, methyl ether ketone, and methyl isobutyl ketone, nitriles such as acetonitrile, propionitrile, butyronitrile, and isobutyronitrile, sulfoxides such as DMSO, water, and 1-methyl-2-pyrrolidone. These solvents may be used alone or in form of a mixture depending on the use.

In terms of the flatness and low temperature sintering property of a silver film to be formed, preferred examples include one or more kinds of ethanol, 1-propanol, 2-propanol, 1-butanol, 2-butanol, 1-pentanol, tert-amyl alcohol, ethylene glycol, butoxyethanol, methoxyethanol, ethoxyethanol, propylene glycol, propylene glycol monomethyl ether, propylene glycol monopropyl ether, propylene glycol monobutyl ether and dipropylene glycol monomethyl ether, methyl ethyl ketone and methyl isobutyl ketone, acetonitrile, propionitrile, butyronitrile, and isobutyronitrile.

In the case where the solvent is used, the order of addition is not particularly limited, and the silver compound (A) may be added to a mixture of the amine compound (B) and the solvent, or the amine compound (B) may be added to a mixture of the silver compound (A) and the solvent, besides the addition of the solvent to a mixture of the silver compound (A) and the amine compound (B).

As necessary, the silver-containing composition used in the present invention may contain a hydrocarbon, acetylene alcohol, silicone oil, or the like to adjust the leveling property to the surface-modified molded article, contain a coupling agent such as a silane coupling agent to adjust the adhesive property to the surface-modified molded article, contain a resin, a plasticizer or the like to adjust the viscosity characteristics, and contain a conductive powder, a glass powder, a surfactant, a metal salt, and other additives which are generally used in this kind of composition solution that are other than those described above.

Regarding the silver-containing composition used in the present invention, the composition may be previously heated to further shorten the sintering time, or a silver colloidal dispersion, in which silver clusters and nano-particles are formed by acting a commonly known reducing agent to the composition, may be produced. In this case, as a reducing agent, a hydrogen boride compound, a tertiary amine, a thiol compound, a phosphorus compound, ascorbic acid, quinones, phenols and the like may be added to an extent that the conductivity and flatness are not lost.

The process for producing a composite of the surface-modified molded article of the present invention and an adherend is not particularly limited as long as it includes a step of bringing the surface of the surface-modified molded article into contact with the adherend and directly bonding the adherend to the surface of the surface-modified molded article. From a viewpoint of obtaining higher bonding strength, the process preferably include a step of curing the adherend (particularly the adherend having a reactive functional group) by heating to directly bond the adherend to the surface of the surface-modified molded article. The condition for curing by heating may be determined properly depending on a constituent material of the adherend, and may be selected from the range of, for example, 20 to 350° C.

In the case where a constituent material of the adherend is vulcanized rubber, a kneaded material of unvulcanized rubber is previously prepared, and in the state that the kneaded material is in contact with the modified surface of the surface-modified molded article, macromolecules are crosslinked by heating and pressurization for a predetermined time to cure the unvulcanized rubber, and the peroxide radicals in the surface of the surface-modified molded article and the reactive functional group of the rubber act on each other to directly bond them together. Consequently, vulcanized rubber having a part which is coated with the surface-modified molded article (a composite of the surface-modified molded article and vulcanized rubber) can be obtained.

In the case where the surface-modified molded article is in a sheet form made of a fluororesin, the surface-modified molded article is heated and pressurized for 10 to 40 minutes at a heating temperature of 140 to 200° C. and a pressure of 10 to 20 MPa. In the case where both the molded article and the adherend are in a sheet form, both of them may be laminated and subjected to compression molding. Further, in the case where an adherend is formed to have a predetermined form and the surface of the adherend is coated with the sheet-like surface-modified molded article, the surface-modified molded article may be previously placed in the cavity inside a die and the adherend may be injected into the cavity to carry out transfer molding.

In the case where the constituent material of the adherend is a thermosetting resin, a liquid containing, for example, a monomer, an oligomer, a polymer, or a crosslinking agent may be applied to the modified surface of the surface-modified molded article and heated, or a powder, a paste, or the like containing a monomer, an oligomer, a polymer, or a crosslinking agent may be brought into contact with the modified surface, heated (at, for example, 20 to 350° C.), and pressurized. By doing so, the thermosetting resin is cured, and the peroxide radicals in the surface of the surface-modified molded article act with the reactive functional group of the thermosetting resin or the crosslinking agent to directly bond them together. Accordingly, a composite of the adherend of the cured thermosetting resin and the surface-modified molded article can be obtained.

In the case where the constituent material of the adherend is the above-mentioned silver-containing composition, for example, the silver-containing composition is prepared and applied to the modified surface of the surface-modified molded article to form an ultrathin film, and heated. By doing so, the silver-containing composition is cured to form a silver thin film layer, and the peroxide radicals in the surface of the surface-modified molded article and the silver-containing composition act on each other to directly bond them together. Consequently, a surface-modified molded article on whose surface the silver thin film layer is formed (a composite of the surface-modified molded article and the silver thin film) can be obtained.

The silver-containing composition can be applied by a spin coating method or printing. Examples of the application method may include a spraying method, an ink-jet printing method, an offset printing method, a gravure offset printing method, an immersion method, and a doctor blade coating method, but are not limited to them.

The heating temperature at the time of heating after application of the silver-containing composition is not particularly limited as long as it is room temperature or higher. However, in consideration of productivity, heating at 80° C. or higher is preferable to carry out the firing in a short time. In the case where a metal silver film or silver wiring is formed on the surface-modified molded article with low heat resistance, firing at a temperature of 80° C. or higher and lower than 150° C. is preferable. In the case where a material excellent in heat resistance such as a fluororesin is used, the firing temperature is preferably 120° C. or higher and lower than 170° C. in view of productivity.

Since the silver compound (A) and the amine compound (B) are used at a specific ratio in the case of use of the above-mentioned silver-containing composition, the silver concentration in the composition can be increased, and a metal silver film can be obtained quickly at a low temperature lower than 150° C. in the absence of a catalyst. Since the metal silver film can be formed at a low temperature, the metal silver film can be formed within a short time, and the metal silver film can be formed in a shorter time at a high temperature of 150° C. or higher. Thus, improvement in productivity can be expected. Further, in the case where the constituent material of the molded article is a fluororesin, particularly PTFE, it is possible to easily provide a metal film-bearing dielectric substrate (a composite), which includes a metal film that is a silver thin film with high adhesive property on the surface of the molded article (a dielectric substrate) made of a fluororesin having a high signal propagation speed and relatively low power consumption, at a low cost as compared with a conventional case.

In the present invention, in the case where the above-mentioned silver-containing composition is used as the constituent material of an adherend, a composite may be formed by carrying out a step of reacting a grafting agent on the surface of the surface-modified molded article, into which the peroxide radicals are introduced, to fix a functional group capable of forming a coordinate bond with a silver ion, and thereafter carrying out a step of applying the above-mentioned silver-containing composition to the surface of the surface-modified molded article to which the functional group capable of forming a coordinate bond with a silver ion is fixed, and heating and curing the composition to form a silver thin film layer. Consequently, since the functional group capable of forming a coordinate bond with a silver ion of the silver-containing composition is fixed by the grafting agent originating at the peroxide radicals formed on the molded article surface by atmospheric-pressure plasma, the adhesive strength of the silver thin film to the molded article surface can be improved.

In the step of fixing the functional group capable of forming a coordinate bond with a silver ion by reacting a grafting agent on the surface of the surface-modified molded article into which the peroxide radicals are introduced, the grafting agent is applied to the surface of the surface-modified molded article into which the peroxide radicals are introduced by an atmospheric-pressure plasma treatment, by, for example, a liquid-phase method such as a spin coating method to produce an ultrathin film. In this case, using the peroxide radicals which are introduced into the surface of the surface-modified molded article as initial points, covalent bonds with the grafting agent are spontaneous formed, and the grafting agent is grafted highly densely from the surface-modified molded article surface. Examples of the method for applying the grafting agent may include, besides the spin coating method, a spraying method, an ink-jet printing method, an offset printing method, a gravure offset printing method, an immersion method, and a doctor blade coating method, but are not limited to them.

The grafting agent to be used in the present invention is preferably a compound or a polymer having a functional group which is capable of forming a coordinate bond with a metal ion, such as a carbonyl group, a lower amino group, a higher amino group, an amido group, a pyridyl group, a pyrrolyl group, an imidazol group, an isocyanate group, a hydroxyl group, an ether group, an ester group, a phosphate group, a urea group, a thiol group, a thienyl group, or a thiourea group, and is more preferably a complex compound or a complex polymer having a functional group which includes an atomic group containing at least one of N, P, and S and is capable of forming a coordinate bond with a silver ion. Concrete examples of a preferable complex compound may include vinylamine, acrylamide, acrylamine, acrylonitrile, vinylaniline, vinyl isocyanate, vinylpyrrol, vinylpyrrolidone, vinyltriazine, vinyl phosphonic acid, vinyl phosphoric acid, vinyl thiol, vinyl thiophene, and vinyl sulfonic acid, but are not limited them. Further, examples of a preferable complex polymer may include polyvinylamine, polyacrylamide, polyacrylamine, polyacrylonitrile, polyvinylaniline, poly(vinyl isocyanate), polyvinylpyrrol, polyvinylpyrrolidone, polyvinyltriazine, polyvinyl phosphonic acid, polyvinyl phosphoric acid, polyvinyl thiol, polyvinyl thiophene, and polyvinyl sulfonic acid, which are polymers of the above-mentioned complex compounds, but are not limited them.

Next, it is preferable to improve the adhesive property of the metal film (silver thin film layer) to be formed finally by washing and removing the unreacted grafting agent which is not directly bonded to the surface of the surface-modified molded article. The washing step may be omitted.

Thereafter, carried out is a step of applying the above-mentioned silver-containing composition to the surface-modified molded article surface on which the above-mentioned functional group capable of forming a coordinate bond with a silver ion is fixed, and heating and curing the composition to form a silver thin film layer. This step can be carried out in the same manner as described above. That is, the ultrathin film is formed by applying the above-mentioned silver-containing composition by a liquid phase method such as a spin coating method, and then heating and curing the thin film of the applied silver-containing composition to form the silver thin film layer.

The composite obtained in the above-mentioned manner is suitable, for example, as a faucet or the like which is to be brought into contact with a pharmaceutical product in a container for sealing the pharmaceutical product, in the case where a constituent material of the molded article is a fluororesin and a constituent material of the adherend is rubber.

Further, in the case where a constituent material of the molded article is a fluororesin and a constituent material of the adherend is a specific silver-containing composition, the composite is suitable for a material of a high frequency printed circuit board.

Hereinafter, the present invention will be explained more concretely with reference to examples. The present invention should not be considered as being limited by the following examples, and, of course, modifications can be made appropriately without departing from the context mentioned above and below, and all of such modifications are within the technical scope of the present invention.

The present application claims the benefit of the priority based on Patent Application No. 2014-181663 filed in Japan on Sep. 5, 2014. The entire contents of Patent Application No. 2014-181663 filed in Japan on Sep. 5, 2014 are hereby incorporated by reference.

EXAMPLES

Examples 1 to 6, Reference Example, and Comparative Example 1

The surface of each sheet-like molded article made of PTFE was modified by atmospheric-pressure plasma using a plasma generation apparatus (manufactured by MEISYO KIKO, Product name: K2X02L023) having the structure shown in FIG. 1.

As the above-mentioned molded article, those obtained by cutting a PTFE sheet (NITOFLON No. 900UL) machined to have a thickness of 0.2 mm by Nitto Denko Corporation into a certain size (width: 30 mm and length: 30 mm) were used. Each molded article was subjected to ultrasonic cleaning for 1 minute in acetone and subjected to ultrasonic cleaning for 1 minute in ultrapure water. Thereafter, ultrapure water adhered to each molded article was removed by blowing nitrogen gas (purity: 99% or higher) with an air gun.

As a high frequency electric power source for a plasma generation apparatus, one having a frequency of application voltage of 13.56 MHz was used. As an electrode, one having a structure formed by sheathing a copper tube having an inner diameter of 1.8 mm, an outer diameter of 3 mm, and a length of 165 mm with an alumina tube having an outer diameter of 5 mm, a thickness of 1 mm, and a length of 100 mm was used. As a sample holder, one made of an aluminum alloy and having a width of 20 mm and a length of 120 mm was used. Each molded article was put on the top surface of the sample holder and the distance between the molded article surface and the electrode was set to 1.0 mm.

After a chamber was tightly closed and decompressed by a rotary pump to 10 Pa, helium gas was introduced into the chamber until the pressure reached atmospheric pressure (1013 hPa). Thereafter, the high frequency electric power source was set so that the output power density shown in Table 1 was given, and the scanning stage was moved so that the electrode moved at a moving rate of 2 mm/s along the entire length (that is, 30 mm) in the longitudinal direction of the molded article. Thereafter, the high frequency electric power source was operated, the scanning stage was moved, and plasma was irradiated under the conditions shown in Table 1. The total irradiation time was adjusted by the number of times of reciprocating the scanning stage. The surface of the molded article at the time of the plasma treatment was measured by a temperature measuring seal (NiGK Corporation, THERMO LABEL). The measurement results are shown in Table 1. The reference example means the PTFE sheet itself which was not subjected to the plasma treatment.

TABLE 1

|  | Example 1 | Example 2 | Example 3 | Example 4 | Example 5 | Example 6 | Reference Example | Comparative Example 1 |
|---|---|---|---|---|---|---|---|---|
| Output Power [W/cm$^2$] | 21.7 | 21.7 | 21.7 | 21.7 | 21.7 | 16.7 | — | 8.3 |
| Plasma Irradiation Time [sec] | 50 | 300 | 600 | 1200 | 3300 | 1200 | — | 1200 |
| Surface Temperature [° C.] | 240 | 240 | 240 or higher | 330 | 330 or higher | 210 | — | 110 |

In the surface temperature measurement for Examples 1, 2, 4, and 6, and Comparative Example 1, the maximum value of the temperature at which discoloration was confirmed with THERMO LABEL (manufactured by NiGK Corporation, 3E-110, 3E-150, 3E-190, 3E-230, THERMO PROOF G-1) was 240° C., 240° C., 330° C., 210° C., and 110° C., respectively. Additionally, in Examples 3 and 5, temperature data were not successfully obtained. Example 3 was an example in which the electric power was same as that in Example 2 and the plasma irradiation time was longer than that in Example 2, and the surface temperature of Example 3 was therefore supposed to be higher than the value of Example 2. Similarly, Example 5 was an example in which the electric power was same as that in Example 4 and plasma irradiation time was longer than that in Example 4, and the surface temperature of Example 5 was therefore supposed to be higher than the value of Example 4.

The obtained surface-modified molded articles were evaluated as follows.

(Evaluation)

<Indentation Hardness by Nano-Indentation>

Using ENT-2100 manufactured by ELIONIX INC., the indentation hardness (Hardness, unit: N/mm$^2$) of the modified surface of the surface-modified molded articles obtained in examples and comparative example was measured. The measurement conditions were an indentation load of 40 µN, a number of measurement times of 50, and a step interval of 20 ms, and the average value was calculated. The calculation results are shown in Table 2.

TABLE 2

|  | Example 3 | Example 4 | Example 6 | Reference Example | Comparative Example 1 |
|---|---|---|---|---|---|
| Indentation hardness [N/mm$^2$] | 208.6 | 203.9 | 175.2 | 121.4 | 141.2 |

<X-Ray Photoelectron Spectroscopy>

Using PHI Quantum 2000 manufactured by ULVAC-PHI, chemical structure analysis for the modified surface of the surface-modified molded articles obtained in Examples 4 and 6 and Comparative Example 1 was carried out by X-ray photoelectron spectroscopy (XPS). An excited X-ray source of the apparatus was Al-Kα ray, and the output power of excited X-rays was adjusted to 25 W. The results of spectra of C1s, F1s, and O1s are shown in FIGS. 2 to 4, respectively.

Figure 2:
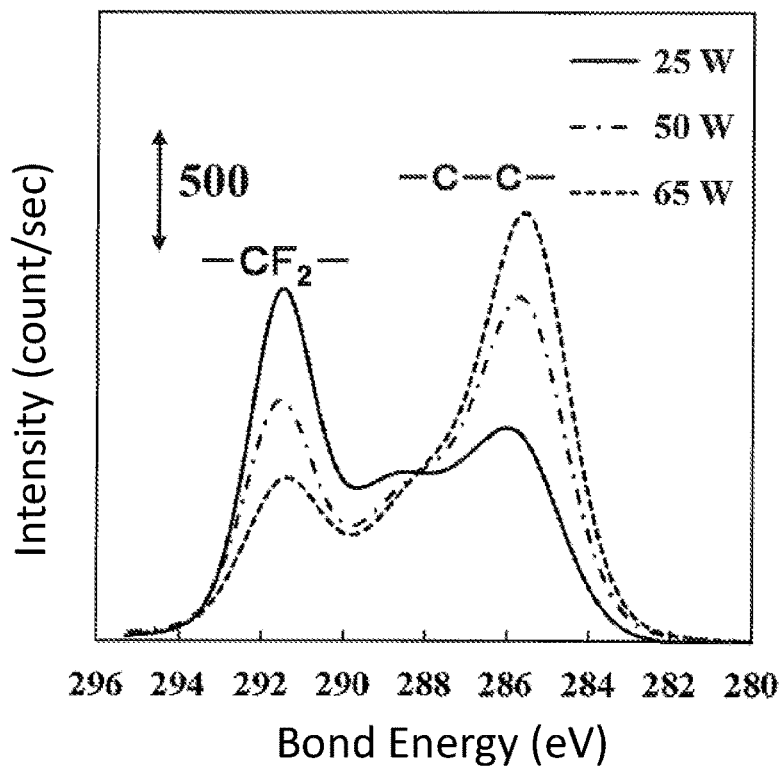
FIG. 2 shows C1s orbit XPS spectra of surface-modified molded articles obtained in Examples 4 and 6 and Comparative Example 1.
Figure 3:
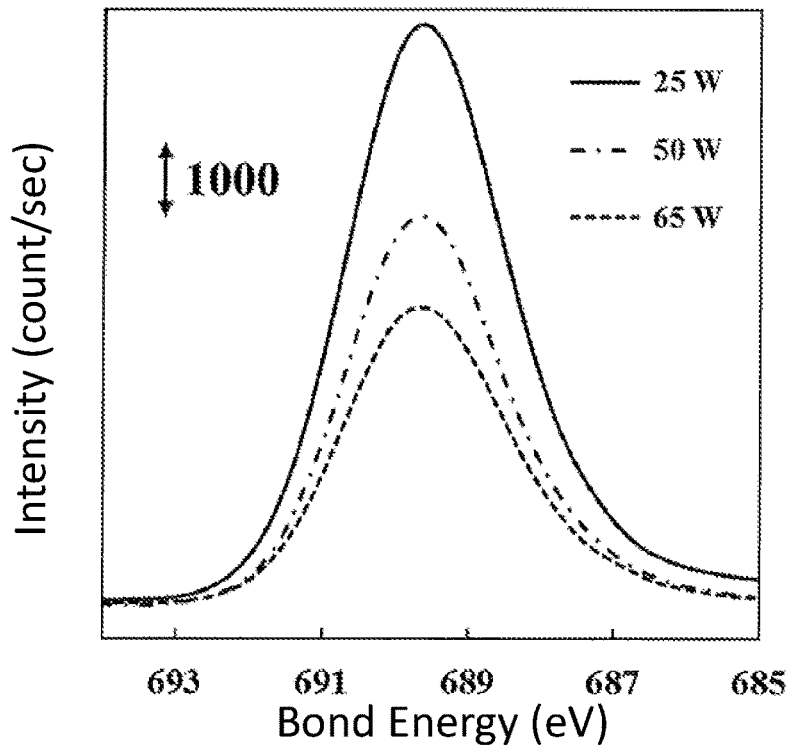
FIG. 3 shows F1s orbit XPS spectra of surface-modified molded articles obtained in Examples 4 and 6 and Comparative Example 1.
Figure 4:
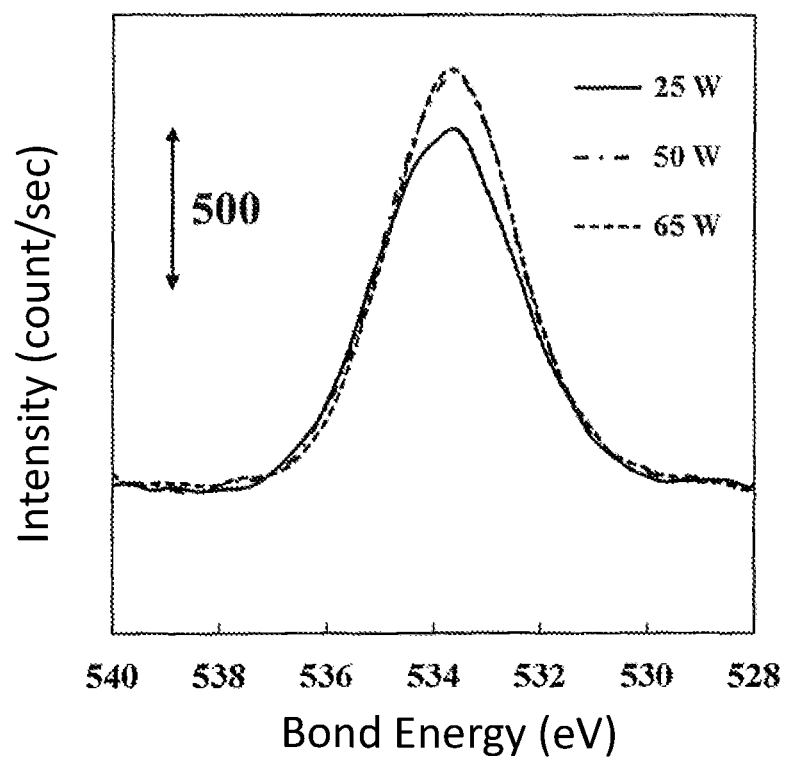
FIG. 4 shows O1s orbit XPS spectra of surface-modified molded articles obtained in Examples 4 and 6 and Comparative Example 1.

The peak derived from the —CF$_2$— bond, that is, the peak near 292 eV shown in the C1s spectrum of FIG. 2 and the peak near 689 eV shown in the F1s spectrum of FIG. 3 decreased in peak intensity when the output power density was increased. This means that carbon-fluorine bonds in PTFE were disconnected and fluorine atoms were removed by atmospheric-pressure plasma when the output power density was increased. On the other hand, the peak near 534 eV shown in the O1s spectrum in FIG. 4 did not increase in peak intensity when the output power was increased and reached above a certain level. That is, even if the output power density was increased, the peroxide radicals or the like to be introduced by atmospheric-pressure plasma did not increase above a certain level. On the other hand, the peak near 286 eV derived from the —C—C— bond shown in the C1s spectrum of FIG. 2 increased in the peak intensity when the output power density was increased.

Taking these facts in a comprehensive way, it is supposed that when an atmospheric-pressure plasma treatment is carried out under conditions for increasing the output power, that is, raising the surface temperature, carbon-fluorine bonds in the surface are cut by atmospheric-pressure plasma, peroxide radicals and the like are bonded to carbon, and carbon-carbon bonds are generated among macromolecules of PTFE. The above-mentioned improvement of indentation hardness is probably attributed to generation of carbon-carbon bonds among macromolecules of PTFE.

<Measurement of Root Mean Square Surface Roughness (rms)>

Using OLS 3100 manufactured by Olympus Corporation, the root mean square surface roughness (nm rms) of the modified surface of surface-modified molded articles obtained in examples and comparative example was measured. Additionally, as a reference example (control), the root mean square surface roughness of the surface of the molded article which was not subjected to an atmospheric-pressure plasma treatment was measured. The measurement results are shown in Table 3.

TABLE 3

|  | Example 1 | Example 4 | Example 5 | Reference Example |
|---|---|---|---|---|
| Root Mean Square Surface Roughness [nm rms] | 157 | 138 | 54 | 150 |

As shown in Table 3, it can be understood that an atmospheric-pressure plasma treatment in a manner of controlling the surface temperature within a predetermined range can make the root mean square surface roughness equivalent to or less than that of the one untreated by an atmospheric-pressure plasma treatment, and can smooth the surface, and that the surface modification method by atmospheric-pressure plasma of the present invention differs from a conventional general plasma treatment.

<Measurement of Peroxide Radical Density>

Using JES-FA 100x manufactured by JEOL Ltd., the modified surface of surface-modified molded articles obtained in Example 4, Example 6, and Comparative Example 1 was analyzed by an electron spin resonance technique. Spectra derived from the obtained peroxide radicals were integrated 2 times to calculate radical density, and using the case of an output power density of 8.3 W/cm$^2$ (Comparative Example 1) as a standard, the standardized peroxide radical density was calculated. As a result, the density was 1.95 in Example 4 and 1.54 in Example 6.

The surface-modified molded articles (the surface-modified PTFE sheets) obtained in Examples 1 to 6, Reference Example, and Comparative Example 1 were used to produce composites with an adherend (butyl-based rubber) in the following manner.

A rubber sheet having a thickness of 2 mm was produced by kneading 100 parts by weight of halogenated butyl rubber (Butyl 1066, ExxonMobil Corporation), 3 parts by weight of 2-di-n-butylamino-4,6-dimercapto-s-triazine (ZISNET (registered trade name), Sankyo Kasei Co., Ltd.) as a crosslinking agent, 3 parts by weight of paraffin-based process oil (Diana Process Oil PW380, Idemitsu Kosan Co., Ltd.) as a plasticizer, and 1 part by weight of magnesium oxide (KYOWAMAG 150 (registered trade name), Kyowa Chemical Industry Co., Ltd.) as an acid acceptor, and using a roller for rubber (400 mm×L500 mm mixing roller manufactured by NIPPON ROLL MFG. Co., Ltd.). The rubber sheet was used as an adherend (unvulcanized rubber sheet) having a reactive functional group to be bonded to a surface-modified molded article. The reactive functional group was a halogen of the butyl rubber and/or a thiol group of the crosslinking agent.

The unvulcanized rubber sheet was brought into contact with and laminated on the surface-modified part of each surface-modified PTFE sheet, and then heated and pressurized at a temperature of 180° C. and a pressure of 10 MPa for 10 minutes by a compression molding machine (NF-50, SHINTO Metal Industries Corporation) to vulcanize and cure the unvulcanized rubber. By doing so, composites in which the vulcanized rubber is directly bonded to the surface of the surface-modified PTFE sheet was obtained. The obtained composites were subjected to the following peeling test.

(Peeling Test)

Each vulcanized rubber sheet (having a thickness of 2 mm) was cut so that a bonded range of 20 mm×30 mm and an unbonded range (holding margin) of 10 mm×30 mm are produced. The PTFE sheet had a size of 30 mm×30 mm and a thickness of 0.2 mm. The bonded range and the unbonded range of the PTFE sheet were same as those of the vulcanized rubber sheet.

Using a universal testing instrument (AUTOGRAPH AG-1000D, SHIMADZU Corporation), a T-shape peeling test was carried out by pinching the holding margin with a chuck and pulling the PTFE sheet and the vulcanized rubber sheet in a direction of 180 degrees. The load cell was set to be 1 kN and the pulling speed was set to be 10 mm/min. The results are shown in Table 4. The values are the maximum values during the test.

<Long Term Preservation Test>

The surface-modified molded article of Example 4 was preserved in a room at a temperature of 23° C. for 33 days. After the preservation, a composite was produced in the same manner as that in Example 4 and the above-mentioned peeling test was carried out. The results are shown together in Table 4.

From Table 4, it can be understood that the peel strength of the composite is remarkably improved in the case where the conditions of the plasma treatment such as output power density and total irradiation time are kept in the predetermined ranges to adjust the surface temperature of the PTFE sheet in a specific range.

In Examples 2 to 5 and the long term preservation test of Example 4, cohesive failure of the vulcanized rubber was confirmed. The peel strength in the long term preservation test of Example 4 was 2.3 N/mm, and the adhesive strength of the composite was inferior to that of the composite (Example 4) produced immediately after the surface treatment. However, the composite obtained after the long term preservation showed such a sufficient adhesive property as to cause cohesive failure of butyl rubber, and it was therefore confirmed that the composite maintained the surface treatment effect.

Particularly, the standardized peroxide radical density in Example 4 was 1.95 (times) larger than that in Comparative Example 1, whereas the peel strength thereof was 25 times larger than that in Comparative Example 1 (=3.0/0.12). That is, it is supposed that, in addition to the improvement of the adhesion to the adherend derived from the peroxide radicals, increase of the carbon-carbon bonds (the crosslinking effect) among macromolecules of PTFE in the surface layer improved the indentation hardness of the PTFE sheet, and the improved strength of the PTFE in the surface layer prevented the surface layer fracture and remarkably improved the peel strength.

Further, the above-mentioned surface-modified molded article of Example 4 was preserved in a room at a temperature of 23° C. for 6 months. After the preservation, a composite was produced in the same manner as that in Example 4 and the above-mentioned peeling test was carried out. As a result, the peel strength was 2.3 N/mm. That is, according to the present invention, it can be understood that good adhesive property is exhibited even after 30 days or longer, further, 6 months or longer.

According to the present invention, since no adhesive is used and monomer vapor does not have to be used, a composite having a peel strength equal to or higher than a composite obtained by a conventional method can be provided without complicated treatment step and complicated apparatus.

Example 7

A composite of the surface-modified molded article (the surface-modified PTFE sheet) obtained in Example 4 and an adherend (a silver-containing composition) was produced in the following manner.

<Synthesis of Silver Acetonethcarboxylate (Silver Salt A)>

Acetonedicarboxylic acid was weighed in an amount of 43.8 g in a 1000 ml beaker, added to and dissolved in 600 g of ion-exchanged water, and cooled with ice. Then, 102 g of silver nitrate was dissolved in the resulting solution and 48 g of hexylamine was put thereto, and the resulting

TABLE 4

| | Example 1 | Example 2 | Example 3 | Example 4 | Example 5 | Example 6 | Reference Example | Comparative Example | Example 4 Long Term Preservation Test | |
|---|---|---|---|---|---|---|---|---|---|---|
| | | | | | | | | | 33 days | 6 months |
| Peel Strength [N/mm] | 1.0 | 1.7 | 2.4 | 3.0 | 1.5 | 0.48 | 0.0 | 0.12 | 2.3 | 2.3 | mixture was stirred for 30 minutes. The resulting white solid was filtrated and washed with acetone, and vacuum-dried to give 88.2 g of silver acetonedicarboxylate in form of a white solid (yield: 82%). Using a thermogravimetric analyzer (manufactured by SII Nano Technology Inc.), the obtained silver acetonedicarboxylate was analyzed by TGA. The analysis conditions were a temperature raising rate of 10° C./min and a measurement atmosphere of air. As a result, the thermal decomposition temperature was 175° C. The residue after the thermogravimetric analysis was 59.7%, which was consistent with the theoretical residual rate (59.4%).

<Production of Silver Ink>

The silver acetonedicarboxylate in an amount of 400 mg which was prepared in the above-mentioned manner was dissolved in 600 mg of 2-ethylhexylamine (2-EHA) in a light-shielding bottle to give a silver acetonedicarboxylate-containing amine solution. The obtained silver acetonedicarboxylate-containing amine solution in an amount of 400 mg was added to 600 mg of isopropyl alcohol (IPA) in a light-shielding bottle to prepare a silver-containing ink solution.

<Production of Composite>

The silver-containing ink solution was applied to the surface of the surface-modified PTFE sheet of Example 4 by a spin coating method. The spin coating was carried out under conditions of a rotating rate of 2000 rpm and a rotating time of 10 seconds.

The silver-containing ink was cured by heat-treating the PTFE sheet, to which the silver-containing ink had been applied, under conditions of a heating temperature of 120° C. and a heating time of 10 minutes. Consequently, a composite in which a metal film of a silver thin film was formed on the surface of the surface-modified PTFE sheet was obtained.

<Adhesive Strength Test>

The adhesive strength between the silver thin film and the PTFE sheet in the obtained composite was evaluated by a 90° peeling test according to JIS K6854-1. A two-pack type epoxy adhesive manufactured by Nagase ChemteX Corporation (base resin: EPDXY RESIN AV 138, curing agent: HARDENER HV 998, mass ratio: base resin/curing agent=2.5/1) was applied to a stainless rod, and the silver thin film was brought into contact with the adhesive. The adhesive was cured under conditions of a heating temperature of 80° C. and a heating time of 30 minutes. As a tensile testing machine, a digital force gauge (ZP-200N) and an electric stand (MX-500N) manufactured by IMADA CO., LTD. were used. The edge of the PTFE sheet was pinched with a clip and the tensile test was carried out at 1 mm/s. In this example, an adhesive strength of 1.26 N/mm was obtained.

Example 8

A composite in which a metal film of a silver thin film was formed on the surface of the surface-modified PTFE sheet was obtained in the same manner as that in Example 7, except that the surface-modified PTFE sheet obtained in Example 4 was used and subjected to the following grafting treatment, and thereafter the silver-containing ink solution was applied to the sheet and the heat treatment was carried out. Regarding the obtained composite, the adhesive strength between the silver thin film and the PTFE sheet was measured in the same manner as that in Example 7, and as a result, an adhesive strength of 1.63 N/mm was obtained.

<Grafting Treatment>

As a grafting agent, a solution obtained by diluting an aminoethylated acrylic polymer (POLYMENT (registered trade name), NK-100 PM manufactured by NIPPON SHOKUBAI CO., LTD.) to 10 wt % with ultrapure water was used. The surface grafting in this example was carried out by immersing the surface-modified molded article of Example 4 in the aminoethylated acrylic polymer for 10 seconds.

To remove the unreacted grafting agent on the PTFE sheet, the surface-grafted molded article was put in a beaker filled with ultrapure water and subjected to ultrasonic cleaning for 1 minute.

Nitrogen gas (purity: 99% or higher) was blown to the molded article after the ultrasonic cleaning with an air gun to scatter and remove ultrapure water.

From the results of Examples 7 and 8, it can be understood that the adhesive strength of the composite is remarkably improved in the case where the conditions of a plasma treatment such as output power density and total irradiation time are kept in the predetermined ranges to adjust the surface temperature of the PTFE sheet in a specific range. That is, as described above, it is supposed that increase of the carbon-carbon bonds among macromolecules of PTFE in the surface layer improved the indentation hardness of the PTFE sheet, and the improved strength of the PTFE in the surface layer prevented the surface layer fracture and remarkably improved the adhesive strength.

Further, it can be understood that, in the case where the grafting treatment is carried out, the adhesive strength is further improved.

Particularly, in a case of a printed board material, this adhesive strength of 0.65 N/mm or higher is required. According to the present invention, a practically usable printed board material can be provided simply at a low cost.

Example 9

Using the same PTFE sheet as the PTFE sheets used in Examples 1 to 6, the surface of the PTFE sheet was heated by using a halogen heater and subjected to a plasma treatment at an output power of 25 W (8.3 W/cm$^2$) and a plasma irradiation time 1200 seconds. The surface temperature of the PTFE sheet was measured by using digital radiation temperature sensors FT-50A, FT-H40K, and KZ-U3# manufactured by KEYENCE CORPORATION in combination to find that the maximum temperature of the PTFE surface was 265° C. In addition, other plasma treatment conditions were same as those for the plasma treatment in Examples 1 to 6.

This PTFE sheet was directly bonded to butyl-based rubber in the same manner as that in Examples 1 to 6 to produce a composite, and the composite was subjected to a peeling test in the same manner as that in Examples 1 to 6. As a result, the peel strength was 2.1 N/mm and the butyl-based rubber was fractured during the measurement. Those which have a peel strength of 2.0 N/mm or higher mean that a fracture doesn't occur at the interface between the PTFE sheet and the rubber but the rubber is broken.

Example 10

As a molded article, ETFE (NEOFLON EF manufactured by Daikin Industries, Ltd., melting point: 254° C.) was used, and a plasma treatment was carried out with the output power being controlled to 40 W (13.3 W/cm$^2$) and the plasma irradiation time being controlled to 600 seconds. The surface temperature of the ETFE sheet was measured in the same manner as that in Example 9 to find that the highest temperature of the ETFE surface was 140° C.

This ETFE sheet was directly bonded to butyl-based rubber in the same manner as that in Examples 1 to 6 to produce a composite, and the composite was subjected to a peeling test in the same manner as that in Examples 1 to 6. As a result, the peel strength was 2.1 N/mm and the butyl-based rubber was fractured during the measurement.

Example 11

As a molded article, FEP (NEOFLON NF manufactured by Daikin Industries, Ltd., melting point: 270° C.) was used, and a plasma treatment was carried out with the output power being controlled to 50 W (16.6 W/cm$^2$) and the plasma irradiation time being controlled to 600 seconds. The surface temperature of the FEP sheet was measured in the same manner as that in Example 9 to find that the highest temperature of the FEP surface was 160° C.

This FEP sheet was directly bonded to butyl-based rubber in the same manner as that in Examples 1 to 6 to produce a composite, and the composite was subjected to a peeling test in the same manner as that in Examples 1 to 6. As a result, the peel strength was 2.9 N/mm and the butyl-based rubber was fractured during the measurement.

Example 12

As a molded article, PFA having a thickness of 0.1 mm (NEOFLON AF-0100 manufactured by Daikin Industries, Ltd.) was used, and a plasma treatment was carried out with the output power being controlled to 65 W (21.7 W/cm$^2$) and the plasma irradiation time being controlled to 300 seconds. The surface temperature of the PFA sheet was measured in the same manner as that in Example 9 to find that the highest temperature of the PFA surface was 250° C.

This PFA sheet was directly bonded to butyl-based rubber in the same manner as that in Examples 1 to 6 to produce a composite, and the composite was subjected to a peeling test in the same manner as that in Examples 1 to 6. As a result, the peel strength was 2.3 N/mm and the butyl-based rubber was fractured during the measurement. In Examples 9 to 12, the rubber was fractured in all cases, but the peel strength (actually, breaking strength of the rubber) was more or less different. This is attributed to unevenness of the strength of the rubber.

Example 13

To the PFA sheet subjected to the plasma treatment in the same manner as that in Example 12, the silver-containing ink solution produced in the same manner as that in Example 7 was applied by a spin coating method. The spin coating was carried out under conditions of a rotating rate of 2000 rpm and a rotating time of 10 seconds. The silver-containing ink was cured by heat-treating the PFA sheet to which the silver-containing ink had been applied under conditions of a heating temperature of 120° C. and a heating time of 10 minutes. Consequently, a composite in which a metal film of a silver thin film is formed on the surface of the surface-modified PFA sheet was obtained.

The adhesive strength between the silver thin film and the PFA sheet in this composite was measured in the same manner as that in Example 7 to find that the adhesive strength was 0.94 N/mm.

Example 14

A plasma treatment was carried out in the same manner as that in Example 1, except that the decompression by a rotary pump was carried out to 500 Pa, the output power was changed to 25 W (8.3 W/cm$^2$), the plasma irradiation time was changed to 1200 seconds, and the surface of the PTFE sheet was heated by using a halogen heater to a highest temperature of 245° C. The measurement of the surface temperature of the PTFE sheet was same as that in Example 9.

This PTFE sheet was directly bonded to butyl-based rubber in the same manner as that in Examples 1 to 6 to produce a composite, and the composite was subjected to a peeling test in the same manner as that in Examples 1 to 6. As a result, the peel strength was 1.2 N/mm.

DESCRIPTION OF REFERENCE SIGNS

10 High frequency electric power source
11 Matching unit
12 Chamber
13 Vacuum exhaust system
14 Electrode
15 Electrode elevating mechanism
16 Scanning stage
17 Inner tube
18 Outer tube
19 Sample holder
A Atmospheric-pressure plasma treatment apparatus

The invention claimed is:

1. A process for producing a surface-modified molded article, wherein a surface of the molded article containing an organic polymer compound is subjected to an atmospheric pressure plasma treatment to introduce a peroxide radical by adjusting the surface temperature of the molded article to 120° C. below the melting point of the organic polymer compound or higher, and a modified surface of the molded article has an indentation hardness by nano-indentation larger than that of the surface of the molded article before the atmospheric-pressure plasma treatment is carried out.

2. The process according to claim 1, wherein the surface temperature of the molded article is 100° C. below the melting point of the organic polymer compound 100° C. or higher.

3. The process according to claim 1, wherein a modified surface of the molded article has an indentation hardness by nano-indentation of 1.4 times or more than that of the surface of the molded article before the atmospheric-pressure plasma treatment is carried out.

4. The process according to claim 1, wherein the organic polymer compound is polytetrafluoroethylene.

5. The process according to claim 1, wherein a modified surface of the molded article has a root mean square surface roughness of 1.5 times or less than that of the surface of the molded article before the atmospheric-pressure plasma treatment is carried out.

6. The process according to claim 1, wherein the atmospheric-pressure plasma treatment is carried out using only a non-polymerizable gas.

* * * * *